United States Patent [19]
Marihart

[11] Patent Number: 4,769,221
[45] Date of Patent: Sep. 6, 1988

[54] CHEMICAL REACTION APPARATUS

[76] Inventor: John R. Marihart, 6086 N. Kavanagh, Fresno, Calif. 93711

[21] Appl. No.: 102,262

[22] Filed: Sep. 24, 1987

Related U.S. Application Data

[63] Continuation of Ser. No. 812,810, Dec. 23, 1985, abandoned.

[51] Int. Cl.⁴ ............................................. B01F 15/02
[52] U.S. Cl. .................................. 422/231; 422/224; 422/234; 261/18.1; 261/124; 366/165
[58] Field of Search .............. 422/203, 224, 231, 234, 422/235; 366/165; 137/263, 266; 261/124, 18.1

[56] References Cited

U.S. PATENT DOCUMENTS

| | | | |
|---|---|---|---|
| 981,098 | 1/1911 | McCaskell | 422/224 |
| 2,624,657 | 1/1953 | Anderson | 422/224 |
| 2,845,336 | 7/1958 | Guyonnaud | 422/231 |
| 3,220,706 | 11/1965 | Valdespino | 261/18 R |
| 3,281,213 | 10/1966 | Waddill | 422/235 |
| 3,475,392 | 10/1969 | McCoy et al. | 422/62 |
| 3,578,431 | 5/1971 | Ingestad et al. | 422/62 |
| 3,725,010 | 4/1973 | Penhasi | 422/62 |
| 3,808,123 | 4/1974 | Neel | 261/124 |
| 3,981,684 | 9/1976 | Mavrovic | 422/235 |

FOREIGN PATENT DOCUMENTS

997788 2/1983 U.S.S.R. .............................. 422/231

Primary Examiner—Barry S. Richman
Assistant Examiner—J. Johnston
Attorney, Agent, or Firm—Townsend & Townsend

[57] ABSTRACT

A chemical reaction apparatus having a reaction tank; at least one manifold providing a plurality of tanks adapted to contain reactants; at least two spargers disposed internally of the reaction tank; and a flow line assembly communicating between the manifold and the reaction tank.

8 Claims, 5 Drawing Sheets

CHEMICAL REACTION APPARATUS

This is a continuation of Ser. No. 812,810, filed Dec. 23, 1985, now abandoned.

BACKGROUND OF THE INVENTION

Related Application Data

Reference is made herein to my copending U.S. patent application Ser. No. 687,442, filed Dec. 28, 1984, now abandoned.

Field of the Invention

The present invention relates to an improved apparatus for use in carrying out chemical reactions and more particularly to such an apparatus incorporating an improved reaction tank portion having utility in the relatively large scale commercial production of a variety of compositions. The present invention further relates to a reaction tank adapted for use in the apparatus of the present invention as well as in other novel apparatuses hereafter developed or conceived.

Description of the Prior Art

A large number of apparatuses have heretofore been commercially available for use in carrying out a variety of processes for the production of chemical compositions. Particularly in the production of chemical compositions useful in agricultural applications, many of such conventional apparatuses are useful in carrying out only a narrow range of related reactions.

In the field of fertilizer and plant nutrient composition production, and more particularly the production of various phosphate-based compositions, the reactors previously proposed have, in many instances, been designed and utilized primarily for a narrow range of relatively similar types of reactions. This may be due, in part, to the limited variety of technologies heretofore conceived for the production of such compositions.

By way of example, it is well known to carry out various conventional processes for producing phosphate compositions in what are commonly referred to as "T" or pipe reactors, the reactions being carried out at temperatures often ranging as high as 600° F. to about 800° F. While such reactors are of utility in carrying out certain of the known processes heretofore conventionally considered desirable, they nevertheless are limited in their applicability and adaptability for novel processes having differing reaction environment requirements. Moreover, many such known reactors are limited in other respects, such as in their inability to be effectively utilized in insuring completeness of reaction and in reducing the overall time required to carry out a given reactive process.

Accordingly, it has been known that it would be desirable to have a chemical reaction apparatus adapted for use in carrying out a wide variety of reactions in the production of various chemical compositions, and more particularly it has been known that it would be desirable to have an apparatus adapted to permit the conducting and development of new processes for the production of phosphate-based agriculturally useful compositions, such as those disclosed in my pending U.S. patent application Ser. No. 687,442, now abandoned, which can dispense with much of the high cost and extreme reaction environments associated with conventional reaction apparatuses and the processes carried out therein.

OBJECTS AND SUMMARY OF THE INVENTION

Therefore, it is an object of the present invention to provide an improved apparatus for use in carrying out chemical reactions.

Another object is to provide such an apparatus which is adapted for use in the commercial production of a wide variety of chemical compositions.

Another object is to provide such an apparatus which finds utility in the relatively large scale production of agriculturally useful compositions.

Another object is to provide such an apparatus which is characterized by providing enhanced control over the reaction environment for various processes carried out utilizing it.

Another object is to provide such an apparatus which is capable of being constructed and operated economically and which is characterized by ease and reliability of operation.

Another object is to provide such an apparatus which is operable to carry out reactions and chemical processes with a maximization of the completeness of such reactions and a minimization of the time required for carrying out such reactions and processes.

Another object is to provide a reaction tank adapted for use in carrying out chemical processes therein with a thoroughness and efficiency otherwise unattainable.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENT

Figure 1:
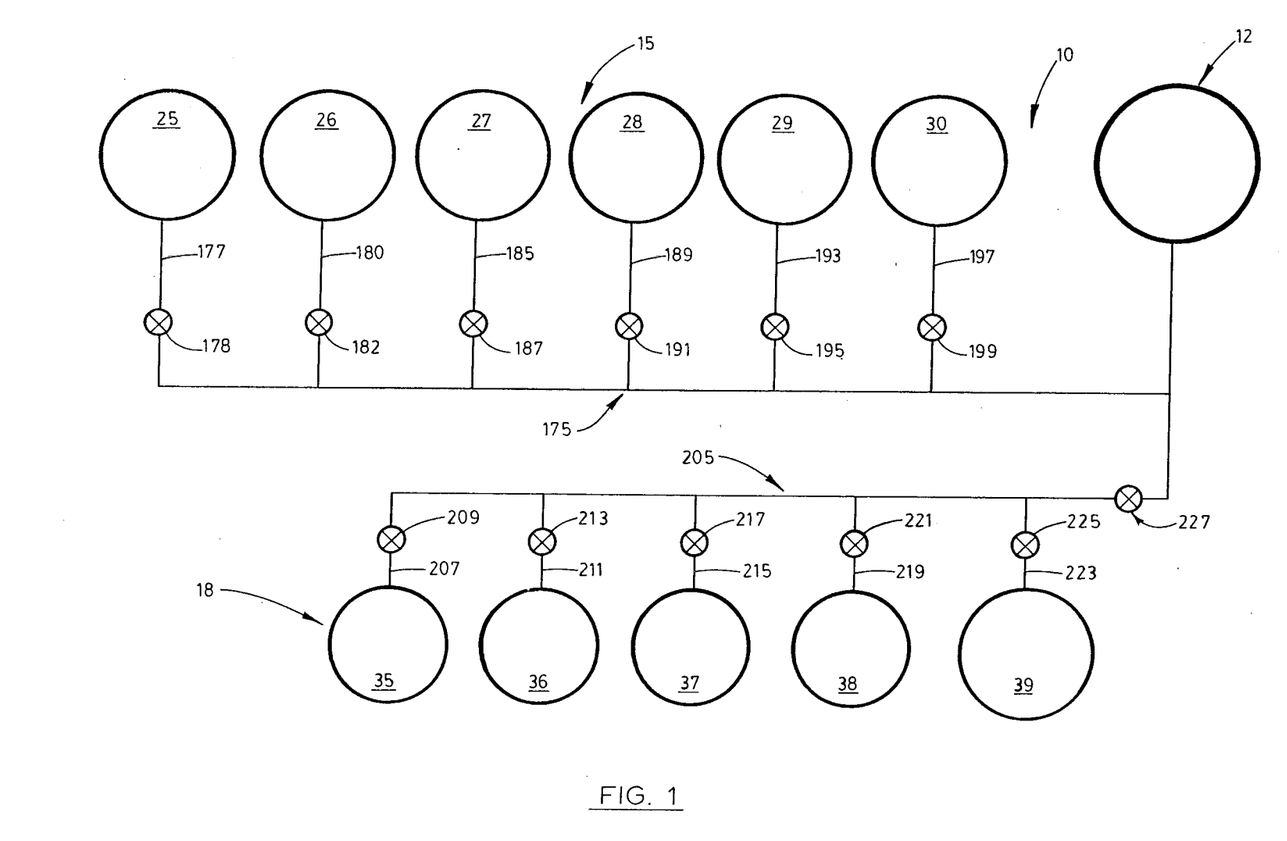
FIG. 1 is a top plan view of the apparatus of the present invention schematically depicting elements thereof.
Figure 2:
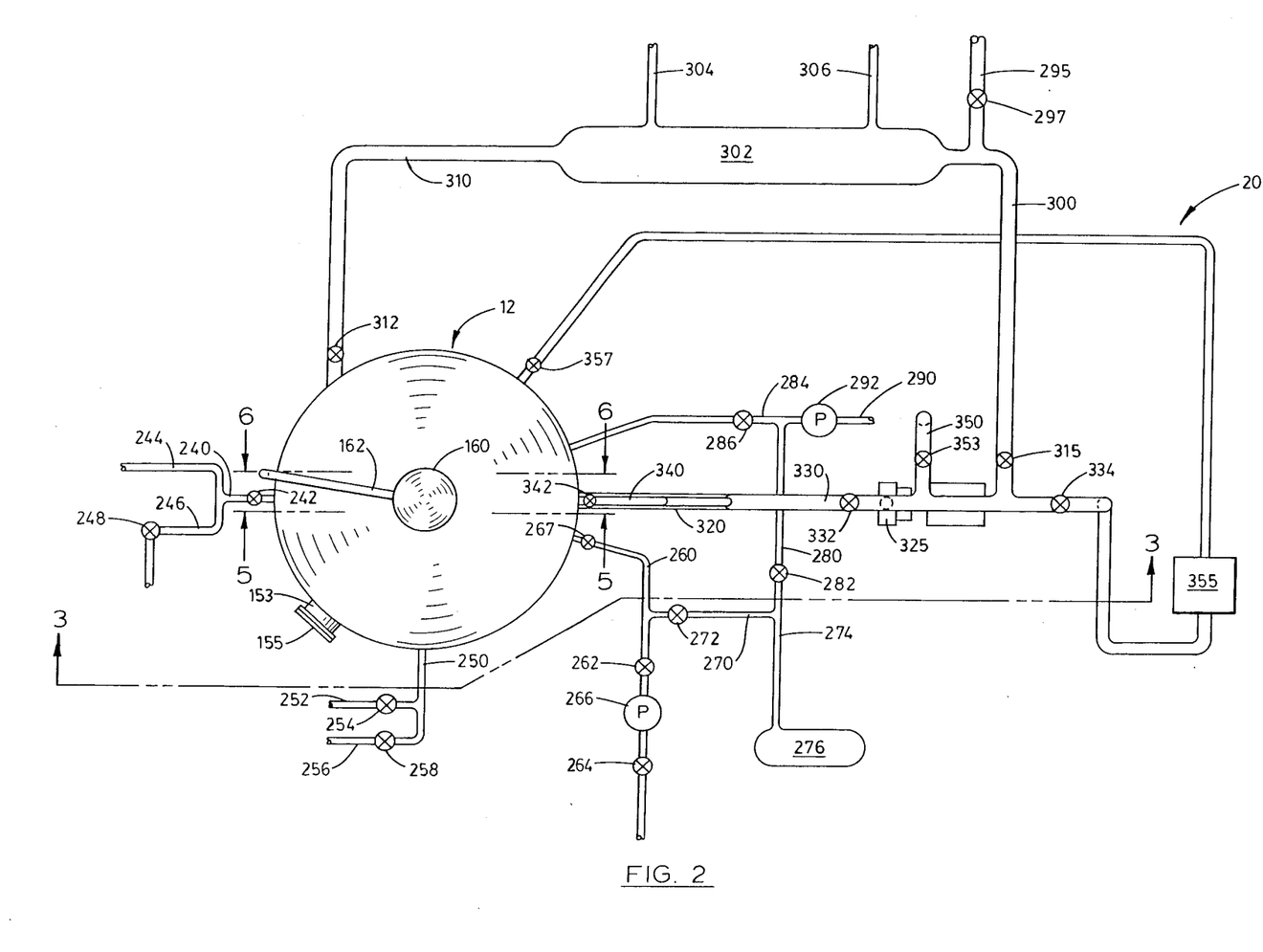
FIG. 2 is a top plan view of a portion of the apparatus of FIG. 1, showing portions of a flow line assembly thereof schematically.

Referring more particularly to the drawings, the apparatus embodying the principles of the present invention is shown in FIGS. 1 and 2 and is designated generally by the numeral 10 therein.

As can best be seen in FIGS. 1 and 2, the apparatus 10 generally includes a novel reaction chamber or reaction tank 12; a primary reactant storage assembly or primary manifold 15; a secondary storage assembly or secondary manifold 18; and a flow line assembly 20.

The primary manifold 15 includes a plurality of storage tanks 25, 26, 27, 28, 29 and 30, each of which is preferably, although not necessarily, of substantially conventional construction. Suitable for such tanks are conventional substantially cylindrical tanks constructed of materials resistant to chemical attack or corrosion. The volume of each tank chosen is dependent largely upon the anticipated volume of the reactant to be stored in the tank for use in carrying out a process utilizing the apparatus 10 and, hence, is not considered limiting.

Further, while the primary manifold 15 of the apparatus 10 of the preferred embodiment is depicted in FIG. 1 as having six storage tanks, it is recognized that a greater or lesser number of such tanks can be used in the primary manifold, as may be necessitated or desirable in carrying out various processes.

The secondary manifold 18 is depicted schematically in FIG. 1 as having five storage tanks 35, 36, 37, 38 and 39, each of which, similar to the tanks of the primary manifold 15, is preferably of substantially conventional construction. Further, the volume of the tanks of the secondary manifold 18 is, again, mainly a matter of choice dependent upon the projected requirements of the operator of the apparatus 10. The secondary manifold is optionally included in the apparatus, as it is recognized that many reaction processes require far fewer different reactants and adjunct fluids than would potentially be contained in the secondary manifold.

Figure 3:
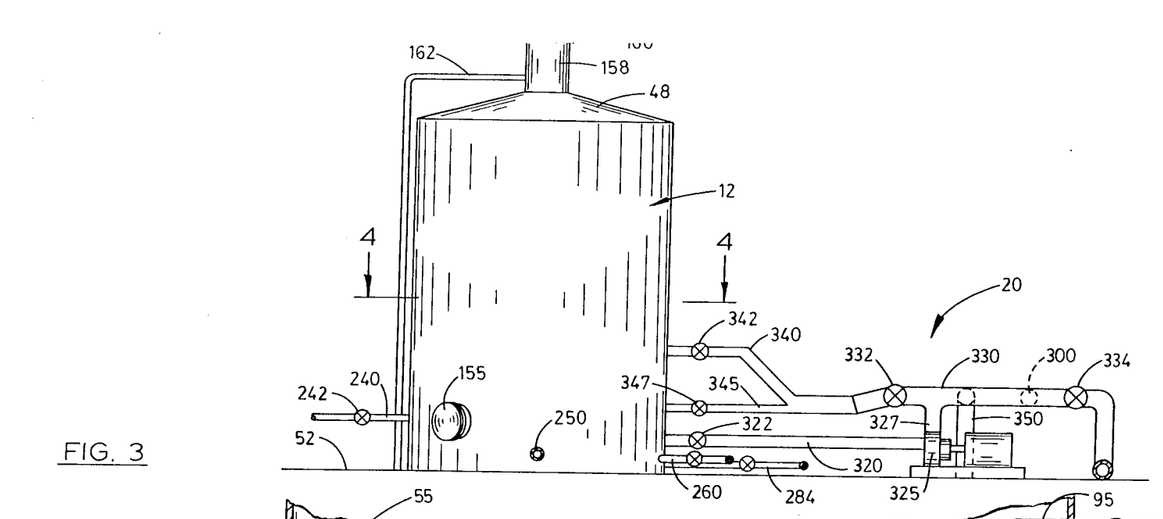
FIG. 3 is a side elevation of the portion of the apparatus shown in FIG. 2 taken generally on line 3—3 in FIG. 2.
Figure 4:
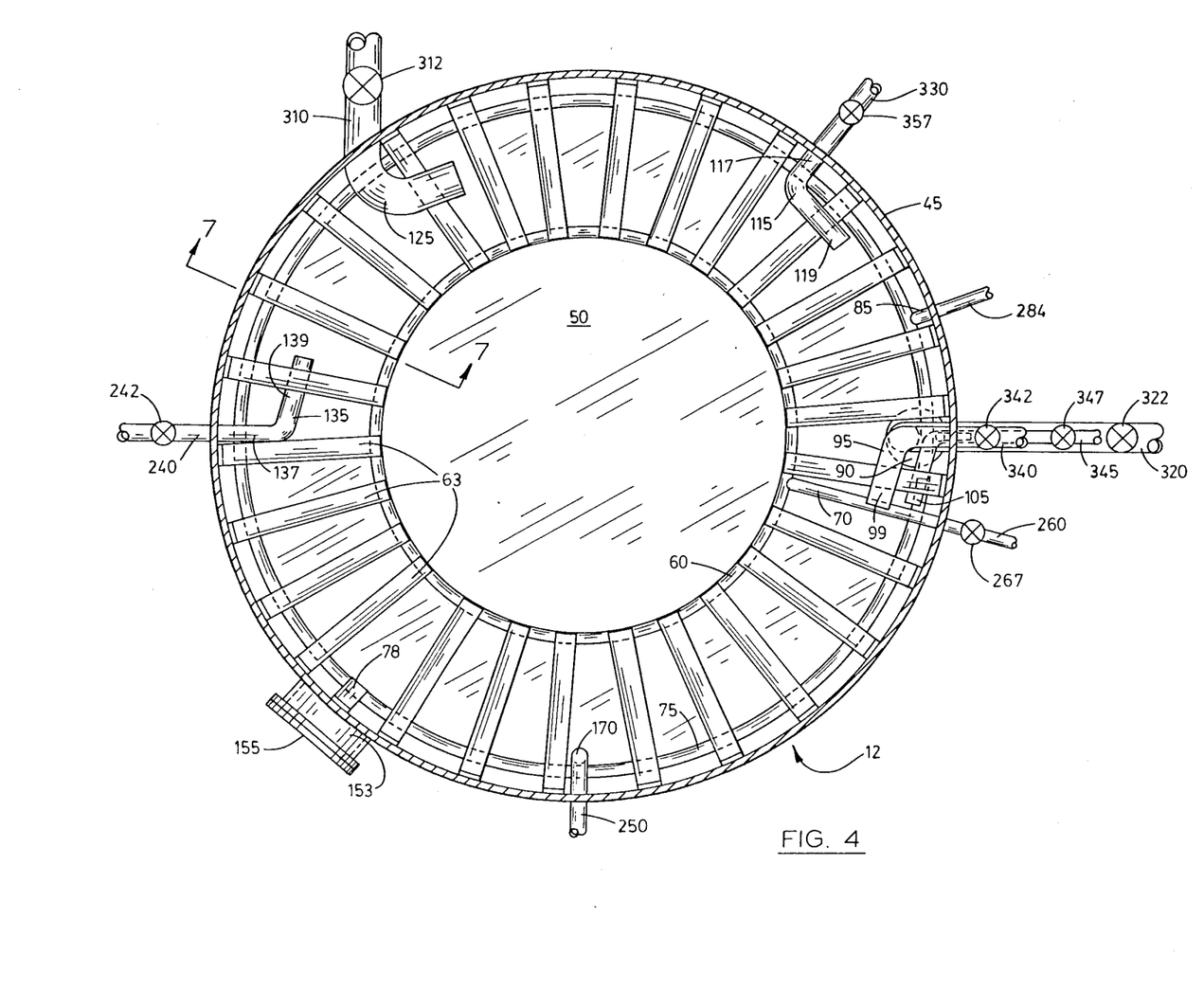
FIG. 4 is a somewhat enlarged transverse section taken on line 4—4 in FIG. 3.
Figure 5:
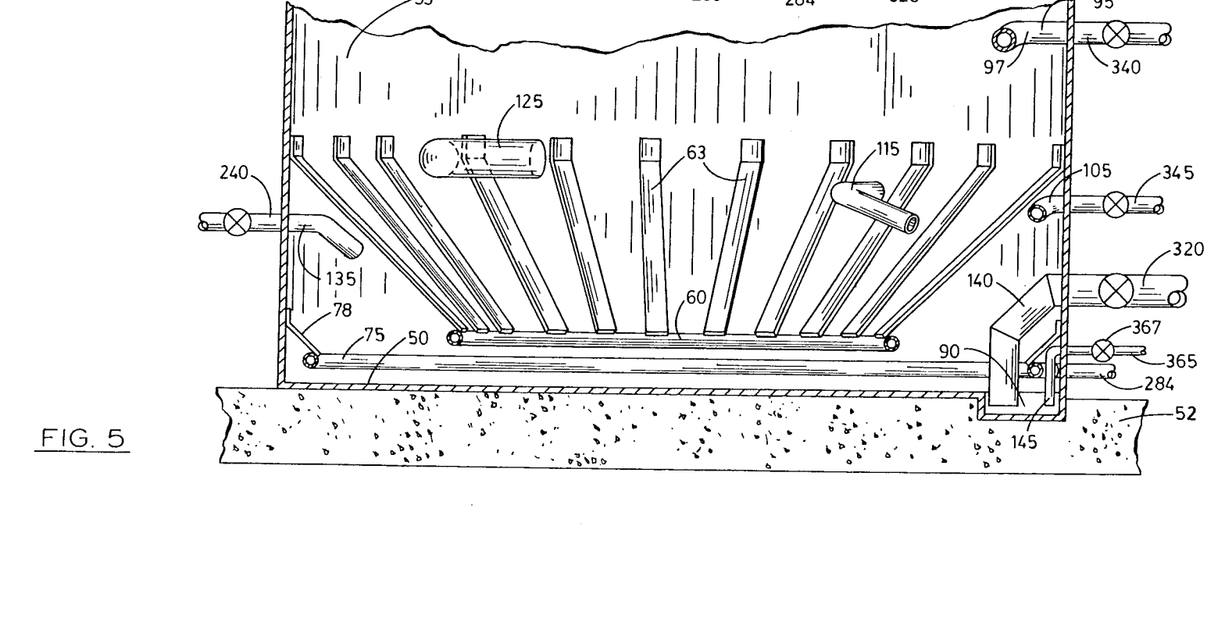
FIG. 5 is a somewhat enlarged fragmentary longitudinal section taken on line 5—5 in FIG. 2.
Figures 6, 7:
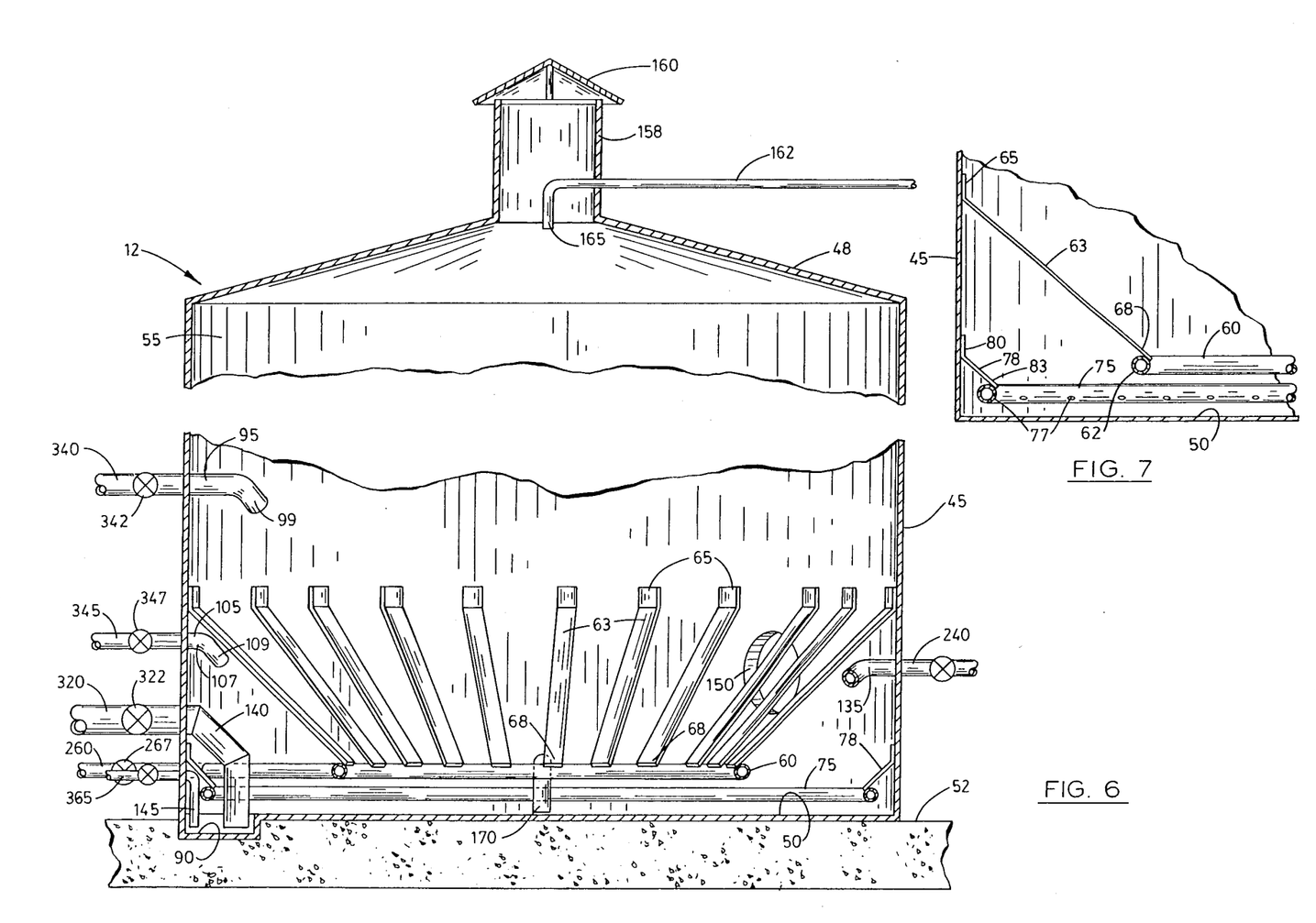
FIG. 6 is a somewhat enlarged fragmentary longitudinal section taken on line 6—6 in FIG. 2.
FIG. 7 is a further enlarged fragmentary detail taken on line 7—7 in FIG. 4.

The reaction tank 12 is best seen in FIGS. 2 through 7. As shown therein, and as can best be seen in FIGS. 2, 3 and 4, the reaction tank generally includes a substantially cylindrical wall 45 mounting a substantially conical upper panel 48 and a substantially flat lower panel 50. As shown in FIGS. 3, 5 and 6, the reaction tank 12 is adapted to be supported on a supporting surface 52, with the lower panel 50 disposed on the supporting surface. The reaction tank 12 is substantially symmetrical about a longitudinal axis of reference.

Collectively, the cylindrical wall 45, upper panel 48 and lower panel 50 bound an internal chamber or cavity 55 of predetermined volume determined by the radius of the cylindrical wall and the height of the cavity measured as the space by which the upper panel is spaced upwardly of the lower panel. As with the tanks of the primary manifold 15 and the secondary manifold 18, the volume of the cavity of the reaction tank 12 is largely related to the intended uses of the apparatus 10 and the needs of the operator of the apparatus. Thus, the volume of a given embodiment of the apparatus can be as great or as small as desired for a particular application, ranging up to and exceeding 10,000 gallons.

The reaction tank 12 has a first sparger member 60 of substantially annular configuration and having a predetermined diameter. The first sparger member is preferably constructed of tubular metal and has a multiplicity of relatively small apertures or perforations 62 communicating between its interior and exterior and spaced circumferentially thereabout. First sparger member 60 is borne by a plurality of struts 63 each having a first end 65 secured as by welding or the like on the cylindrical wall 45 of the reaction tank 12, and a second end 68 secured on the first sparger member. The first sparger member is retained in an elevated attitude relative to the lower panel 50 of the reaction tank in relatively close proximity thereto.

As can best be seen by reference to FIG. 7, the perforations 62 of the first sparger member are oriented to direct fluids exiting therefrom obliquely downwardly toward the cylindrical wall 45 and bottom panel 50. This orientation creates a preferred initial path of fluid flow having advantages hereafter described in greater detail.

A tubular fluid flow line 70 extends through the cylindrical wall 45 of the reaction tank 12 and communicates with the first sparger member 60 for the delivery of fluids to the interior of the sparger member for delivery of such fluids through the perforations thereof to the cavity 55. As described in greater detail hereafter, the fluids delivered through fluid flow line 70 can be liquid, gaseous, or a combination of both.

A second sparger member 75 of substantially annular, tubular construction is mounted internally of the cavity 55 of the reaction tank 12. The second sparger member is preferably, although not necessarily, of greater diameter than the first sparger member 60. As does the first sparger member 60, the second sparger member 75 has a multiplicity of perforations or apertures 77 thereabout. The apertures 77 are preferably oriented to define an initial path of flow of fluids therethrough which is obliquely downwardly directed toward the bottom panel 50 and away from the cylindrical wall 45, as can best be seen in FIG. 7. Thus, the initial paths of flow of fluids discharged into the cavity from the sparger members are substantially convergent. This direction of the fluids, it has been discovered, provides the surprising result of creating an initial reaction region intermediate the sparger members when separate reactants are flown through them. Such reaction region is spaced from the sparger members and, particularly in instances such as those in which an acidic reactant is delivered through one sparger member and a basic reactant is delivered through the other, yielding an exothermic reaction, a turbulence is created in the reaction region. Such turbulence is found to be beneficial in dissipating heat generated by the reaction to prevent what might be otherwise deleterious effects. Further, the reaction is caused to take place away from either sparger member, whereby possible clogging or partial occlusion of the apertures is minimized.

The second sparger member is mounted by a plurality of struts 78 each having a first end 80 secured on the cylindrical wall 45 of the reaction tank and a second end 83 secured on the second sparger member. As can best be seen in FIGS. 5 and 6, the second sparger member is supported above the lower panel of the reaction tank, intermediate the lower panel and the first sparger member. A fluid flow line 85 extends through the cylindrical wall and is connected in fluid flow relation to the second sparger member for the delivery of fluids thereto. Accordingly, the fluid flow line 85 and second sparger member provide a flow path for the flow of fluids between the exterior of the reaction tank 12 and the internal cavity 55.

As can best be seen in FIGS. 4, 5 and 6, the lower panel 50 of the reaction tank 12 has a recess or well portion 90 of substantially cylindrical configuration extending downwardly relative to the upper panel 48. The well portion is adapted to permit the collection of fluids therein for evacuation of the reaction tank, as is described in greater detail hereafter.

The reaction tank 12 includes an inlet conduit 95 disposed above the struts 63 intermediate the lower panel 50 and upper panel 48. The inlet conduit 95 is tubular and is preferably constructed of a metal, such as stainless steel or other suitable material, resistant to chemical attack. The inlet conduit 95 has a neck portion 97 extending substantially radially inwardly of the cylindrical wall 45 and a discharge portion 99 disposed obliquely relative to the neck portion to define a path of flow therefrom substantially tangential to an annular path of reference which is substantially concentric with the cylindrical wall. Thus, fluids exiting the discharge portion 99 are initially directed in a predetermined, substantially non-radial direction about the internal cavity 55.

A second inlet conduit 105 extends from the cylindrical wall 45 into the reaction tank and, similar to the inlet conduit 95, provides a neck portion 107 and a discharge portion 109. As can best be seen by reference to FIGS. 4 and 5, the second inlet conduit 105 is of tubular construction and has an inside diameter less than that of the inlet conduit 95. Further, the second inlet conduit 105 is disposed intermediate the inlet conduit 95 and the lower panel 50 of the reaction tank. The neck portion 107 is of lesser length than the neck portion 97, and the discharge portion 109 is disposed in an oblique relation to the neck portion substantially similar to the angular relation of the neck portion 97 and discharge portion 99 of the inlet conduit 95. Accordingly, the path of flow of fluids discharged from the discharge portion 109 is initially substantially parallel to that of fluids exiting the discharge portion 99, and is substantially non-radially directed into the cavity of the reaction tank.

A third inlet conduit 115 extends from the cylindrical wall 45 in spaced relation to the inlet conduit 95 and second inlet conduit 105 and is spaced above the lower panel 50. The third inlet conduit has a neck portion 117 and a discharge portion 119 of tubular metallic construction. The discharge portion 119 is disposed to direct fluids exiting therefrom in an initial direction of flow substantially tangential to an annular path of reference substantially concentric with the cylindrical wall 45, with such direction of flow being directed obliquely downwardly toward the lower panel 50. As do the inlet conduits 95 and 105, the inlet conduit 115 is oriented to create an initial non-radial path of fluid flow.

A fourth inlet conduit 125 extends from the cylindrical wall 45 into the internal cavity 55. The fourth inlet conduit is preferably, although not necessarily, of tubular construction having an internal diameter greater than that of the inlet conduit 95. The fourth inlet conduit is spaced above the lower panel 50 and is spaced about the cylindrical wall from the inlet conduits 95, 105 and 115 in a generally upstream relation to the paths of flow thereof.

A fifth inlet conduit 135 extends from the cylindrical wall 45 into the internal cavity 55 and is spaced above the lower panel 50. The fifth inlet conduit 135 has a neck portion 137 extending substantially radially inwardly of the cylindrical wall, and a discharge portion 139 obliquely disposed relative to the neck portion 137. The fifth inlet conduit is spaced about the cylindrical wall 45 from the remaining inlet conduits. The discharge portion 139 is angled obliquely downwardly from the neck portion 137 and is disposed to define an initial path of flow of fluids discharged therefrom substantially tangential to an annular path of reference substantially concentric with the cylindrical wall. The initial paths of fluid flow of inlet conduits 125 and 135 are also non-radially directed into the cavity.

Accordingly, it is seen that the inlet conduits 95, 105, 115, 125 and 135 are disposed relative to each other to define paths of flow of fluids discharged therefrom to the internal cavity 55 which are generally complementary and are directed in a generally similar angular direction about the internal cavity. Accordingly, the entry of fluids through one or more of the inlet conduits exerts a swirling effect on a body of fluid present in the reaction tank.

A tubular outlet conduit 140 extends from the cylindrical wall of the reaction tank 12 into the well 90. A tubular second outlet conduit 145 extends from the cylindrical wall into the well. Both outlet conduits are disposed to permit the withdrawal of fluids from the reaction tank.

A substantially annular opening 150 is defined in the cylindrical wall 45 and provides communication to the internal cavity 55 of the reaction tank 12 through a portal 153 having a removable cover 155 secured thereto in substantially fluid-tight relation. The portal and annular opening permit access to the internal cavity for servicing, cleaning and the like.

The upper panel 48 of the reaction tank 12 has a vent 158 substantially centrally thereof. The vent mounts a cover member 160 in spaced relation thereto disposed and dimensioned to permit the passage of gases from the reaction tank without the entry of undesirable foreign materials, such as rain, airborne debris and the like through the vent. A fluid supply line 162 having a discharge end portion 165 extends through the vent 158. The fluid supply line is adapted to be connected in fluid flow relation to a pressurized source of fluids, such as water, (not shown) for the delivery of such fluids to the internal cavity of the reaction tank. The fluid supply line finds primary utility in the rinsing of the reaction tank subsequent to operation of the apparatus 10, and the discharge end portion 165 is preferably, although not necessarily, fitted with suitable means (not shown) for the substantially even dispersal of the fluids exiting there-from about the interior of the reaction tank.

A third outlet conduit 170 extends from the cylindrical wall 45 toward the lower panel 50 of the reaction tank.

As can best be seen in FIG. 1, a fluid flow line assembly 175, comprising a portion of the flow line assembly 20, communicates in fluid flow relation between the primary manifold 15 and the remaining portions of the flow line assembly 20 for the delivery of fluids from the tanks of the primary manifold to the reaction tank, as is described in greater detail hereafter. The fluid flow line assembly 175 is actually comprised of a plurality of individual tubular flow lines which, for purposes of illustration, are depicted schematically as a single line in FIG. 1.

A fluid flow line 177 communicates between tank 25 and flow line assembly 175. A valve 178 is mounted on flow line 177 and is operable selectively to permit or prevent the flow of fluid from tank 25 to flow line assembly 175.

A fluid flow line 180 connects tank 26 and flow line assembly 175, and includes valve 182.

A fluid flow line 185 connects tank 27 and flow line assembly 175, and includes a valve 187.

A fluid flow line 189 connects tank 28 and flow line assembly 175, and includes a valve 191.

A fluid flow line 193 connects tank 29 and flow line assembly 175, and includes a valve 195.

A fluid flow line 197 connects tank 30 and flow line assembly 175, and includes a valve 199.

A fluid flow line assembly 205 communicates between the secondary manifold 18 and flow line assembly 175, and is similarly comprised of a plurality of individual flow lines which are, again, depicted schematically as a single line for purposes of illustration.

A fluid flow line 207 connects tank 35 and flow line assembly 205, and includes a valve 209.

A fluid flow line 211 connects tank 36 and flow line assembly 205, and includes a valve 213.

A fluid flow line 215 connects tank 37 and flow line assembly 205, and includes a valve 217.

A fluid flow line 219 connects tank 38 and flow line assembly 205, and includes a valve 221.

A fluid flow line 223 connects tank 39 and flow line assembly 205, and includes a valve 225.

Fluid flow line assembly 205 includes a valve assembly 227 intermediate the secondary manifold 18 and flow line assembly 175.

Referring more particularly to FIG. 2, the remaining portions of flow line assembly 20 are fragmentarily depicted therein.

A fluid flow line 240 communicates in fluid flow relation to inlet conduit 135. Flow line 240 mounts a valve 242. Flow line 240 is connected to a fluid flow line 244 which communicates with the secondary manifold 18 through flow line assembly 205. Flow line 240 is also connected to a fluid flow line 246 mounting a valve 248, flow line 246 also being connected in fluid flow relation to a portion of flow line assembly 205 for the delivery of fluids therefrom to the reaction tank 12. It will be recognized that flow lines 240 and 246 are utilized only in limited circumstances in which the secondary manifold 18 is used for containing materials useful in carrying out processes for which the capacity of the primary manifold is exceeded or for the introduction of non-reactants whose introduction to the tank 12 is not preferably made via the sparger members.

Flow line 250 communicates with outlet conduit 170 and is connected to flow line 252, mounting a valve 254, and flow line 256, mounting a valve 258. Flow line 252 communicates with tank 30 of the primary manifold 15. Flow line 256 communicates with remote storage facilities (not shown) to permit the flow of fluids from reaction tank 12 for storage thereof.

Flow line 260 communicates between the primary manifold 15 and flow line 70 for the delivery of fluids from the primary manifold to first sparger member 60. Flow of fluid in flow line 260 is in the direction from the primary manifold toward the reaction tank 12. Flow line 260 includes a first valve 262 and a second valve 264 downstream therefrom. A pump 266 is mounted on flow line 260 between valves 262 and 264. The pump is of conventional construction and is operable to assist the flow of fluids toward the reaction tank. A third valve 267 is mounted by flow line 260 between the pump 266 and the reaction tank.

A flow line 270 intersects with flow line 260 in fluid flow relation thereto and mounts a valve 272. A flow line 274 communicates with flow line 270. Flow line 274 is connected on a source of compressed or pressurized gas 276, depicted schematically in FIG. 2, for the delivery of gas to flow line 270.

Flow line 274 communicates with a flow line 280, which includes a valve 282.

Flow line 280 communicates with a flow line 284, which communicates with flow line 85 in the reaction tank 12. Flow line 284 includes a valve 286.

A flow line 290 communicates with flow line 284 and is connected in fluid flow relation to flow line assembly 175 for the delivery of fluids from the primary manifold 15 to the reaction tank. Flow line 290 is depicted fragmentarily for illustrative purposes and includes a conventional pump 292 operable to enhance the flow of fluids from flow line assembly 175 therethrough.

A flow line 295 mounting a valve 297 is connected to tank 29 of the primary manifold 15 through flow line 193. Flow line 295 communicates with a flow line 300, which is connected in fluid flow retention to a conventional water cooled heat exchanger 302. Heat exchanger 302 is connected by a flow line 304 to a source of water (not shown) and provides a flow line 306 adapted to carry water from the heat exchanger to drainage facilities (not shown). It is to be noted that tank flow line assembly 175 also communicates with tank 29 for delivery of fluids therefrom to the reaction tank through flow line 290.

A flow line 310 communicates between the heat exchanger 302 and inlet conduit 125 of the reaction tank 12. Fluids carried in flow line 300 are able to flow through heat exchanger 302 toward the reaction tank. Flow line 310 includes a valve 312. Flow line 300 includes a valve 315.

As can best be seen in FIG. 3, a fluid flow line 320 communicates with outlet conduit 140 and includes a valve 322. Remote from the reaction tank 12, flow line 320 terminates on a pump 325 providing internal means for causing the flow of fluids therethrough. The pump is conventionally operable to draw fluids through flow line 320 away from the reaction tank 12.

A flow line 327 communicates with the pump 325 for the flow of fluids from the pump therethrough. Flow line 327 communicates with a flow line 330 including a first valve 332 and a second valve 334 opposite the point of intersection of flow lines 327 and 330.

Flow line 330 communicates with a first delivery flow line 340 including a valve 342, and a second delivery flow line 345 mounting a valve 347. Flow line 340 communicates with inlet conduit 95 for the delivery of fluids to the reaction tank therethrough. Flow line 345 communicates with inlet conduit 105 for the delivery of fluids to the reaction tank therethrough.

A discharge flow line 350 communicates with flow line 330 intermediate the valves 332 and 334. Flow line 350 is connected remotely from the apparatus 10 with one or more storage tanks (not shown), and includes a valve 353.

Intermediate valve 334 and its point of intersection with flow line 350, flow line 330 intersects in fluid flow relation with flow line 300.

Distal to valve 334 relative to the reaction tank 12, flow line 330 extends through a conventionally operable dry inductor 355. The dry inductor is operable to permit the introduction of dry reactants or other nonliquid materials to fluids flowing through flow line 330 when fluids are caused to flow through valve 334. Remote from dry inductor 355, flow line 330 communicates with inlet conduit 115 for the delivery of fluids to the reaction tank. A valve 357 is mounted on flow line 330 intermediate the inductor and inlet conduit 115.

Accordingly, it is seen that a closed loop is provided by the network of flow lines comprised of flow lines 340, 330, and 300, heat exchanger 302, and flow line 310, whereby fluids can be caused to flow out of the reaction tank for cooling by the heat exchanger as well as for the introduction of reactants at the inductor 155 without interruption of any processes carried out by the apparatus.

Each of the valves mounted on the flow lines may be either manually operable or mechanically controlled, and operate in a conventional manner whereby the flow of fluids through the valves can be restricted and the rate of flow regulated.

Further, it is preferable that metering means be provided to determine the volume of flow through a given flow line. Also, although not shown in the drawings, it is desirable that the apparatus 10 incorporate monitoring means for ascertaining the temperature and pH of the fluids flowing into and out of the reaction tank 12 where processes having restrictions as to such characteristics are carried out utilizing the apparatus.

OPERATION

The operation of the described embodiment of the present invention is believed most readily understood by reference to the following illustrative examples.

The apparatus 10 of the present invention finds particular utility in the production of various agriculturally and horticulturally useful compositions, although it is understood that it is not restricted to such uses. Further, the apparatus is employed to greatest advantages in carrying out processes for the production of various compositions wherein such processes necessitate substantially close regulation of the temperature of the reactants—such as in exothermic reactions—or require thorough agitation and mixing of fluid reactants during the course of the reaction.

The following examples typify the types of reactions adapted to be carried out utilizing the described apparatus and are substantially similar to reactions disclosed in my pending U.S. patent application Ser. No. 687,442.

EXAMPLE I

Production of Liquid Phosphate-Based Compositions

This example relates to the operation of the apparatus 10 in the production of a composition having a ratio of nitrogen to phosphorous to potassium of 9:18:9.

In preparing the apparatus for use in carrying out the reaction to produce the desired end product, suitable reactants are chosen and are stored in the primary manifold 15 of the apparatus.

In this example, phosphoric acid of suitable volume is introduced into tank 27. For illustrative purposes, super green phosphoric acid having a strength of approximately 70% $P_2O_5$ is selected.

A volume of a 50% potassium hydroxide solution is stored in tank 28.

Water is stored in tank 30.

Aqua having a strength of 20% $NH_3$ is stored in tank 29.

A 32% solution of urea is stored in tank 25.

Water is conducted from tank 30 to the reaction tank 12 by opening valves 199 and 254. A volume of water representing 10% by weight of the desired volume of resultant product is transferred to the reaction tank. When such volume has been transferred, valves 199 and 254 are closed to prevent further flow of water from tank 30.

Next, phosphoric acid and potassium hydroxide are introduced substantially simultaneously to the reaction tank 12. Valve 187 is opened, as are valves 262, 264 and 267. Pump 266 is activated to draw the phosphoric acid from tank 27 through flow line 185 to flow line 260 and from there to flow line 70 and first sparger member 60. The acid exits the sparger member and enters the internal cavity 55 of the reaction tank under agitation as it passes through the apertures of the sparger member.

The potassium hydroxide is transferred from tank 28 through flow line 189 upon the opening of valve 191.

Valve 286 is opened and pump 292 is activated to assist the flow of the potassium hydroxide through flow line 284 to flow line 85, and from flow line 85 to second sparger member 75, exiting the sparger member to the internal cavity 55 of the reaction tank.

The volume of phosphoric acid and potassium hydroxide transferred to the reaction tank is dependent upon the desired final volume and analysis of the reaction product. In this illustrative example, the volumes of the acid and potassium hydroxide used are, respectively, approximately 25.8% and 21.6% of the final volume by weight.

Next, aqua is transferred from tank 29 to the reaction tank 12. Valves 195, and 286 are opened, permitting flow of the aqua through flow lines 193, flow line assembly 175 and 284 to the second sparger member 75 and into the reaction tank.

During the course of the reaction it is desirable that the reaction mixture be maintained at a temperature below 210° F. Therefore, as the reaction progresses, the temperature is monitored and, as the temperature increases due to the exothermic reaction taking place, the reaction mixture is drawn through the closed loop defined by the flow lines communicating with the heat exchanger 302. Valves 322, 315 and 312 are opened. Pump 325 is activated, causing the fluid reaction mixture to be drawn from the reaction tank through outlet conduit 140 and thence through flow lines 320, 330, and 300, then through the heat exchanger and back to the reaction tank via flow line 310.

When the temperature of the reaction medium is low enough to permit cessation of operation of the heat exchanger, valves 332, 342 and 347 can be opened to allow recirculation of the fluid drawn from outlet conduit 140 through flow lines 340 and 345, respectively, for reentry to the reaction tank through inlet conduits 95 and 105. Such recirculation enhances the thoroughness of the mixing of the reactants to help assure complete reaction thereof in a minimal period of time.

Further agitation of the reactants can be achieved by the delivery of compressed air from the source of pressurized gas 276 upon the opening of valves 272 and 282 during the introduction of the phosphoric acid, aqua and potassium hydroxide. The compressed air is released with the acid, aqua and hydroxide through sparger members 60 and 75. As the air is released through the perforations of the sparger members, it is dispersed through the agitated fluid in the form of fine bubbles which collectively exert a mixing effect on the fluid. Also, as described previously, the air and liquids exiting from the sparger members are initially directed in substantially convergent paths of flow, whereby reaction thereamong takes place under substantially turbulent conditions, with consequent dissipation of localized heating effects from the exothermic reaction.

EXAMPLE II

Production of Liquid Phosphate Composition Incorporating Humic Acids

In this example, a liquid composition having a nitrogen to phosphate ratio of 8:24 combined with humic acids is prepared. It is understood that the volumes and percentages given are illustrative only and are not limiting with regard to the concepts of the present invention.

Phosphoric acid is placed in tank 27 prior to commencing operation of the apparatus 10.

In tank 29 is placed a mixture of a 20% aqua solution and liquid humic substances, the humic substances being preferably comprised of relatively small weight humic acid fractions.

Substantially simultaneously, the phosphoric acid and the aqua/humic mixture are introduced into the reaction tank in the manner described in reference to the introduction of the phosphoric acid and aqua used in the process illustrated in Example I by operating the appropriate valves. The volume of aqua used is approximately 22% by weight of the desired total reactant volume. The volume of phosphoric acid used is approximately 34.3% by weight of the desired final volume. The volume of humic acids can be anywhere from about 3% to about 10%.

As in the process of Example I, the temperature of the reaction medium is maintained below 210° F. by operation of the heat exchanger. Further, it is preferable that air be forcibly dispersed through the reaction medium via sparger members 60 and 75 during delivery of reactants by operation of the compressed gas source 276.

The reaction is permitted to continue for several hours to insure completeness.

Subsequent to the reactions illustrated in both of the foregoing examples, the reaction product can be evacuated and transferred to remote storage by opening valve 353 and closing valves 312, 315, and 332 while operating pump 325. The fluids removed through flow line 320 are then transferred through flow line 350 to suitable storage facilities.

Upon evacuation of the reaction tank 12, water or detergent fluids can be delivered to the tank through flow line 162 for rinsing of the tank's interior.

The tanks 35 through 39 of the secondary manifold 18 are particularly useful for the storage of additional reactants or for containing substances such as fluid mixtures of minor nutrients such as zinc, iron, manganese and copper for addition to the reaction products produced by processes carried out utilizing the apparatus 10.

The inductor 355 is operable to introduce dry materials to the liquid reaction medium in the reaction tank. In the foregoing examples, for instance, dry urea can be added through the inductor 355 to increase the overall nitrogen titer of the final reacted product. This is accomplished by opening valves 334 and 357 during operation of pump 325 to flow fluids through flow line 330 and through inductor 355 for reintroduction of the fluids into the reaction tank 12 through inlet conduit 115. Dry urea is poured into inductor 355 and is drawn by fluid flow in flow line 330 from the inductor.

Thus, it will be seen from the foregoing that the present invention provides a flexible apparatus adapted for use in carrying out various processes for producing chemical compositions and mixtures. The apparatus has great utility in the conducting of reactions requiring thorough, constant mixing of reactants, or those in which restriction of temperatures in the reaction medium is essential or desirable. Further, it will be noted that the apparatus of the present invention is characterized by an inherent degree of safety provided by multiple valving of virtually every flow line. Moreover, the apparatus can be constructed in a wide variety of capacities for use in a broad range of operative environments for the production of disparate volumes of reaction products.

The combined mixing means provided by the sparger members and the various inlet conduits reduce the possibility of localized heat buildup within the reaction tank during the carrying out of exothermic processes and further insure the complete and thorough contacting of the reactants utilized to permit conducting reactions in a minimum of time. Moreover, the novel construction of the reaction tank portion of the apparatus eliminates the need for mechanical mixing or stirring means within the tank, thus reducing the potential for mechanical failure of the tank portion and making it feasible to construct the tank economically.

The provision of the recirculation assembly comprised of flow lines 300, 310, 320, 330, 340 and 345, as well as the heat exchanger 302, permits enhancement of the mixing of the reactants of a given chemical reaction while also providing means for closely regulating the temperature of the reaction medium.

Finally, both the reaction tank and apparatus of the present invention will find utility in a wide variety of chemical process environments, including not only known reactive processes but novel processes not yet developed.

While the present invention has been shown and described in what is conceived to be the most practical and preferred embodiment thereof, it will be recognized that departures may be made therefrom within the scope of the invention, which is not to be limited to the illustrative details disclosed.

Having described my invention, what I claim as new and desire to secure by Letters Patent is:

1. An apparatus for carrying out chemical reactions comprising:
   at least one manifold having a plurality of storage tanks each adapted to contain a volume of fluid reactants for use in a chemical reaction;
   a reaction tank providing a substantially cylindrical wall having an upper end portion and an opposite lower end portion, the wall being substantially concentric about a longitudinal axis of reference extending between the upper and lower end portions; a substantially flat bottom panel secured in sealing relation on the lower end portion of the wall; and upper panel secured in covering relation on the upper end portion of the wall, the upper panel, bottom panel and wall collectively bounding a chamber;
   a first, substantially annular sparger member mounted in the chamber in spaced relation to the bottom panel and having a multiplicity of apertures circumferentially thereabout for delivery of fluids through the apertures to the chamber;
   a second, substantially annular sparger member mounted in the chamber having a diameter greater than that of the first sparger member and spaced nearer to the bottom panel than is the first sparger member, the second sparger member being disposed substantially concentrically of the first sparger member and having a plurality of apertures circumferentially thereabout for the delivery of fluids through the apertures to the chamber;
   a plurality of individual inlet conduits spaced from each other about the wall and spaced from the sparger members, said inlet conduits being positioned and arranged to conduct fluids into the chamber along substantially non-radial paths of flow within the chamber;
   at least one outlet conduit in flow communication with the chamber and arranged and positioned to conduct fluids from the chamber;

a flow line assembly in flow communication with the manifold to deliver fluids to each of said first sparger member and said second sparger member the inlet conduits, said flow line assembly being further connected to said at least one outlet conduit to conduct fluids out from the chamber; and a recirculation assembly connected in fluid flow relation to at least one of said plurality of inlet conduits and said at least one outlet conduit for circulation of fluids therebetween, the recirculation assembly including a pair of first flow lines connected in fluid flow relation to a pair of said plurality of inlet conduits; a second flow line connected to another of said plurality of inlet conduits remote from the plurality of inlet conduits connected to the first flow lines; valve means for directing fluids through the first flow lines and second flow line; and heat exchanger means mounted in one of said first flow lines and said second flow line for reducing the temperature of fluids conducted therethrough.

2. The apparatus of claim 1 wherein the apertures of the second sparger member are oriented to initially direct fluids conducted therethrough substantially obliquely away from the wall and toward the bottom panel of the chamber.

3. The apparatus of claim 2 wherein the apertures of the first sparger member are oriented to initially direct fluids conducted therethrough substantially obliquely toward the wall and the bottom panel of the chamber.

4. The apparatus of claim 3, wherein the flow line assembly further comprises a valve and is in fluid communication with at least one source of compressed gases for delivery of gases to the first sparger member and the second sparger member.

5. The apparatus of claim 1 wherein the heat exchanger means is positioned in the second flow line of the recirculation assembly.

6. The apparatus of claim 5 wherein the recirculation assembly further comprises a third flow line connected in fluid flow relation to an additional inlet conduit which comprises inductor means for introducing non-liquid materials into fluids flowing therethrough for delivery thereof to the chamber of the reaction tank.

7. The apparatus of claim 6 wherein the apertures of the second sparger member are oriented to initially direct fluids conducted therethrough substantially obliquely away from the wall and toward the bottom panel of the chamber.

8. The apparatus of claim 7 wherein the apertures of the first sparger member are oriented to initially direct fluids conducted therethrough substantially obliquely toward the wall and the bottom panel of the chamber.

* * * * *